United States Patent

Smythe

[15] 3,676,893
[45] July 18, 1972

[54] ROTARY MOWER

[72] Inventor: Eric Patrick Greenwood Smythe, Port Elizabeth, Republic of South Africa

[73] Assignee: Republic Mower Company (Proprietary) Limited, Sidwell, Port Elizabeth, Cape Province, Republic of South Africa

[22] Filed: June 29, 1970

[21] Appl. No.: 50,760

[30] Foreign Application Priority Data

July 15, 1969 South Africa..........................69/5015

[52] U.S. Cl. ................................15/328, 15/338, 56/DIG. 8
[51] Int. Cl. .........................................................A47l 9/00
[58] Field of Search ..........................15/328, 334, 337, 338; 37/43 L; 56/13.1, DIG. 8

[56] References Cited

UNITED STATES PATENTS

| | | | |
|---|---|---|---|
| 1,021,731 | 3/1912 | Spangler | 15/338 |
| 3,142,913 | 8/1964 | Jacob | 15/328 X |
| 3,373,514 | 3/1968 | Forren | 15/328 X |

*Primary Examiner*—Walter A. Scheel
*Assistant Examiner*—C. K. Moore
*Attorney*—Karl W. Flocks

[57] ABSTRACT

A rotary lawn mower having rotary cutter means and having a suction cover removably fitted to the mower to provide a suction inlet leading to the rotary cutter means. The suction cover is adapted to be removed to expose the rotary cutter means for mowing. The rotary cutter means may be adapted to provide suction, or the rotary cutter means may be replaced by a suction impeller, so that the mower can be used as a suction cleaner device when the suction cover is fitted thereto.

1 Claim, 4 Drawing Figures

Patented July 18, 1972 3,676,893

Inventor:
Eric Patrick Greenwood Smythe
By
Ken W. Flocks
Attorney

ROTARY MOWER

FIELD OF INVENTION

This invention relates to improvements in and relating to a rotary mower.

SUMMARY OF THE INVENTION

According to the invention there is provided a rotary mower having rotary cutter means, and being adapted to have a suction cover fitted thereto to at least partly enclose the rotary cutter means and provide a suction inlet leading to the rotary cutter means, thereby converting the mower to a suction cleaner device.

Further according to the invention there is provided a rotary mower having rotary cutter means and having a suction cover removably fitted to the mower to at least partly enclose the rotary cutter means and provide a suction inlet leading to the rotary cutter means, thereby allowing the mower to serve as a suction cleaner device, the suction cover being adapted to be removed to expose the rotary cutter means for mowing.

Where the rotary cutter means is shaped so that it is incapable of producing suction, or of producing sufficient suction, the rotary cutter means may be removably mounted on the mower and may be adapted to be replaced by a suction impeller. Alternatively, the rotary cutter means may be adapted to be adjusted to produce suction. Thus, for example, the rotary cutter means may have blades with the pitch of the blades being adapted to be adjusted.

The rotary mower may have a substantially annular depending skirt defining a cavity within which the rotary cutter means is adapted to rotate. The depending skirt may have a depth so that the rotary cutter means and suction impeller do not depend below the lower edge of the depending skirt.

The depending skirt may have engagement means for engaging with the suction cover. The suction cover may have an annular projecting lip clipping about a peripheral portion of the depending skirt.

The suction inlet may have a suction accessory integrally connected thereto. Alternatively, the suction inlet may be adapted to have a suction accessory connected thereto. The suction accessory may be adapted to be connected to the suction inlet via, for example, a spigot and socket connection, a screw threaded connection, or a bayonet connection.

The suction accessory may be of any desired type. Thus, for example, it may be in the form of an elongated flexible suction nozzle, or in the form of an outwardly diverging nozzle.

The suction cover may have lead-in recess means leading to the suction inlet from the periphery of the suction cover.

The invention extends to the combination of a rotary mower having rotary cutter means, and a suction cover adapted to be fitted to the mower to at least partly enclose the rotary cutter means and define a suction inlet leading to the rotary cutter means.

The combination may include a suction cover having a suction accessory integrally connected to the suction inlet. The combination may further include a suction accessory adapted to be connected to the suction inlet.

The invention further extends to a suction cover adapted to be fitted to a rotary mower having rotary cutter means, to at least partly enclose the rotary cutter means, the cover having a suction inlet to lead to the rotary cutter means.

The invention is now described by way of example with reference to the accompanying drawings.

DESCRIPTION OF PREFERRED EMBODIMENTS

Figure 1:
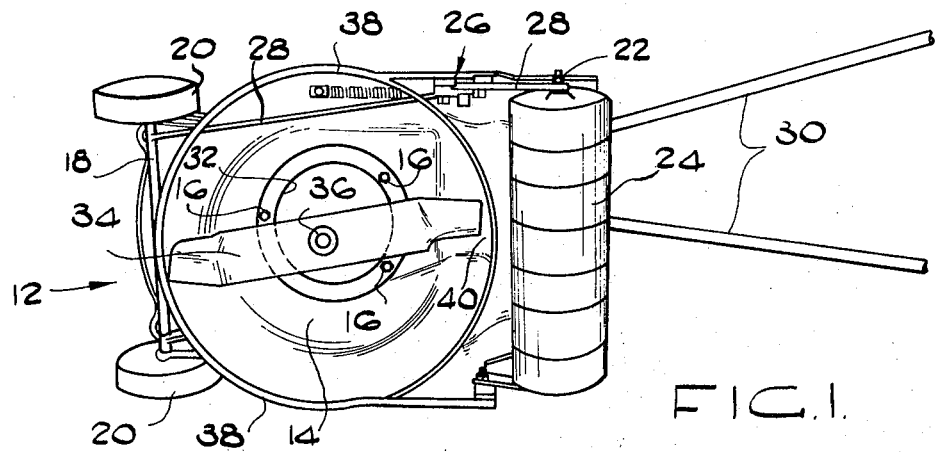
FIG. 1 shows an oblique underside fragmentary view of a rotary mower having rotary cutter means.

With reference to the drawings, reference numeral 10 refers generally to a rotary lawn mower having a body portion 12 with a top plate 14 on which a driving motor (not shown) is mounted by means of bolts 16 (shown in FIG. 1).

The body portion 12 has a front axle 18 on which front wheels 20 are mounted, and has a rear axle 22 on which a rear roller 24 is mounted.

The rotary mower 10 includes height adjustment means 26 operatively connected to the front and rear axles 18 and 22 by means of connection members 28 for adjusting the height at which the body portion 12 is supported above ground level.

The rotary mower 10 further has operating handle means 30 connected thereto for use in displacing the rotary mower 10 during use.

With particular reference to FIG. 1 of the drawings, the top plate 14 has an aperture 32 through which a driven shaft (not shown) of the driving motor extends.

The rotary lawn mower 10 has rotary cutter means 34 removably mounted on the driven shaft by means of a high tensile bolt 36 engaging in a screw threaded bore provided in the end of the driven shaft.

The body portion 12 has an annular depending skirt 38 defining a cavity within which the rotary cutter means 34 is adapted to rotate.

Figure 2:
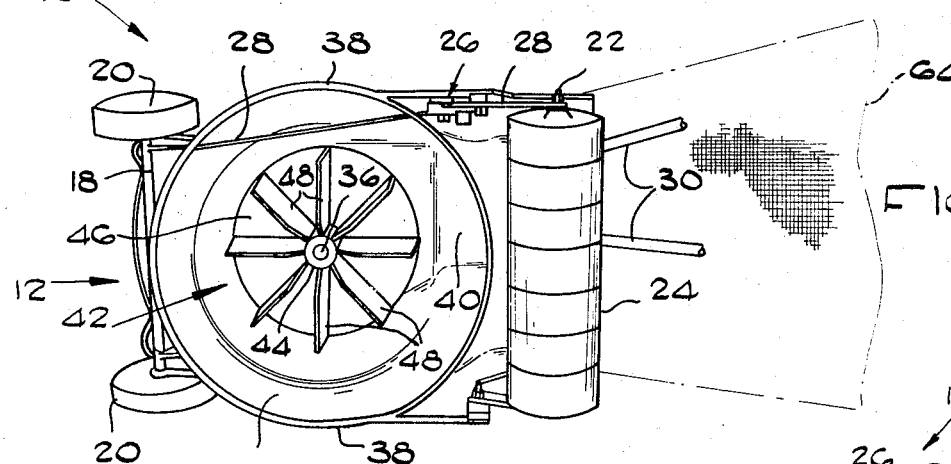
FIG. 2 shows an oblique underside fragmentary view of the rotary mower of FIG. 1, with the rotary cutter means replaced by a suction impeller.

As illustrated in FIGS. 1 and 2 of the drawings, the rotary lawn mower 10 has an extractor chute 40 through which matter entering the cavity defined by the annular depending skirt 38 is adapted to be extracted. The top plate 14 is shaped to form a semi-annular chute of gradually increasing depth leading to the extractor chute 40, thereby allowing matter entering the cavity defined by the skirt 38 to be readily displaced towards the extractor chute 40.

The rotary lawn mower illustrated in FIG. 1 of the drawings is adapted to be used for mowing, but is adapted to be converted to serve as a suction cleaner device.

The conversion of the rotary lawn mower 10 is now described with reference to FIGS. 1, 2 and 3 of the drawings.

The rotary cutter means 34 illustrated in FIG. 1 of the drawings, is not adapted to create sufficient suction for the purposes of a suction cleaner device. It is therefore removably mounted on the driven shaft by means of the bolt 36. The bolt 36 can therefore be removed to remove the rotary cutter means 34, and the rotary cutter means 34 can be replaced by a suction impeller 42 as illustrated in FIGS. 2 and 3 of the drawings. The suction impeller 42 is removably mounted on the driven shaft by means of the bolt 36.

The suction impeller 42 has a central hub 44 which is mounted on a backing disc 46, with the hub 44 having impeller blades 48 extending radially outwardly. The impeller blades 48 are integral with the backing disc 46 to stabilize the impeller blades 48.

Each impeller blade 48 increases in depth as it extends outwardly from the central hub 44.

Figure 3:
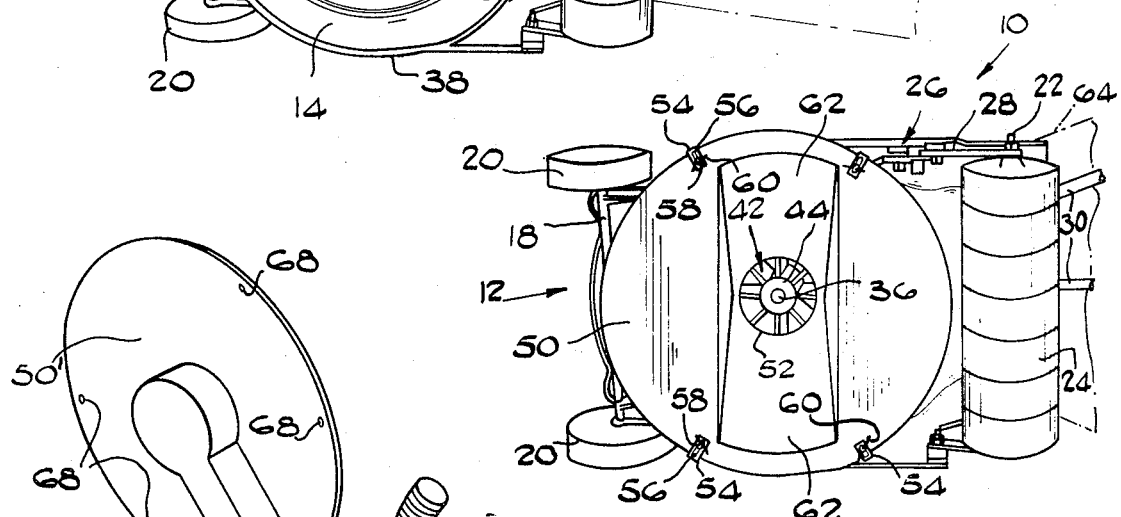
FIG. 3 shows an oblique underside fragmentary view of the rotary mower of FIG. 2, having a suction cover removably fitted thereto.

The rotary lawn mower 10 illustrated in FIGS. 1 and 2 of the drawings, is finally converted to a suction cleaner device by having a suction cover 50 as illustrated in FIG. 3 of the drawings, removably fitted thereto.

The suction cover 50 encloses the suction impeller 42 and provides a suction inlet 52 leading to the suction impeller 42.

The suction cover 50 is fitted to the depending skirt 38 by means of substantially channel section brackets 54. The one flange of each bracket 54 is adapted to engage an outwardly extending ridge provided along the periphery of the depending skirt 38 whereas the other flange of each bracket 54 has an elongated slot 56 for receiving a threaded pin 58 extending from the suction cover 50 and having a wing nut 60 engaging therewith.

As can be seen in FIG. 3 of the drawings, the suction cover 50 has lead-in recess means 62 leading to the suction inlet 52 from the periphery of the suction cover 50.

The device illustrated in FIGS. 2 and 3 of the drawings, has a trash bag 64 indicated in chain dotted lines connected thereto for receiving matter passing through the extractor chute 40.

The suction inlet 52 of the suction cover 50 may be adapted to have a suction accessory connected thereto. The suction accessory may, for example, be in the form of an elongated flexible suction nozzle, or in the form of an outwardly diverging nozzle.

Figure 4:
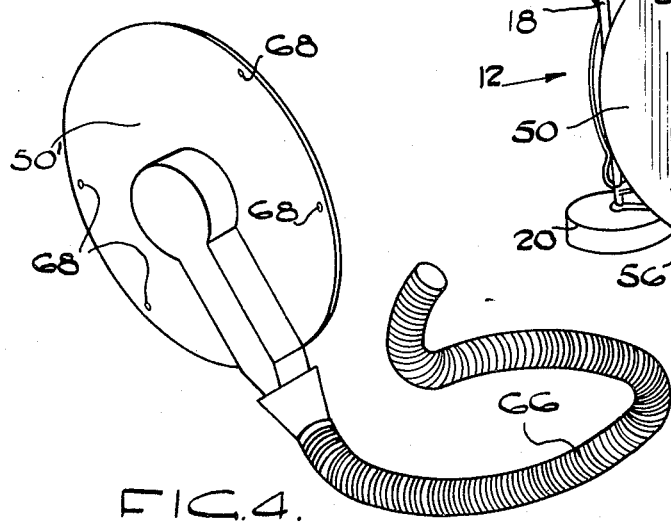
FIG. 4 shows an oblique view of an alternative embodiment of the suction cover illustrated in FIG. 3.

With reference to FIG. 4 of the drawings, an alternative embodiment of a suction cover 50 is illustrated, which has a suction accessory in the form of an elongated flexible suction nozzle 66 integrally connected thereto.

The suction cover 50 illustrated in FIG. 4 of the drawings has 4 threaded apertures 68 for receiving the threaded pins illustrated in FIG. 3 of the drawings.

The depending skirt 38 of the rotary mower 10 has a depth in relation to the depth of the rotary cutter means 34 and the suction impeller 42 so that it depends below the rotary cutter means 34 or suction impeller 42 as the case may be.

It will be appreciated that, where the rotary cutter means is shaped so that it can create sufficient suction for the purposes of the suction cleaner device, the rotary cutter means need not be replaced by a suction impeller when the rotary lawn mower is converted to a suction cleaner device. Alternatively, the rotary cutter means 34 may have its blades pivotally mounted on a central hub, thereby allowing the pitch of the blades to be adjusted so that the rotary cutter means can provide sufficient suction for the purposes of a suction cleaner device.

The trash bag 64 is removably connected to the rotary lawn mower 10 and can be removed altogether when the mower is used for mowing, or can be replaced by a grass box or a deflector plate.

The suction cover may be of any suitable material. It may conveniently be of sheet metal or of a suitable synthetic plastic material. It may, if desired, be provided with reinforcing ribs.

It is an advantage of this invention that the rotary mower of this invention can be used for mowing, and can then be readily converted to serve as a suction cleaner device.

I claim:

1. In combination, a rotary mower comprising
   a body portion including a top plate and an annular skirt depending from said top plate to define a cavity which is open at its lower end,
   a suction impeller adapted to selectively replace a rotary cutter means, mounted adjacent said top plate,
   and a suction cover adapted to be selectively fitted to said annular skirt to close the lower end of said cavity, when said suction impeller is mounted in position,
   said suction cover having a central suction inlet to lead to said cavity, and having lead-in means recessed into said cavity leading inwardly from two opposed edges of said suction cover to said suction inlet,
   said suction impeller and said suction cover being adapted to be fitted to the mower to allow it to serve as a suction cleaner device.

* * * * *